US007652861B2

(12) United States Patent
Yamada

(10) Patent No.: US 7,652,861 B2
(45) Date of Patent: Jan. 26, 2010

(54) OVERCURRENT DETECTING CIRCUIT AND REFERENCE VOLTAGE GENERATING CIRCUIT

(75) Inventor: Kouhei Yamada, Matsumoto (JP)

(73) Assignee: Fuji Electric Device Technology Co., Ltd., Tokyo (JP)

( * ) Notice: Subject to any disclaimer, the term of this patent is extended or adjusted under 35 U.S.C. 154(b) by 374 days.

(21) Appl. No.: 11/516,581

(22) Filed: Sep. 7, 2006

(65) Prior Publication Data

US 2007/0064367 A1 Mar. 22, 2007

(30) Foreign Application Priority Data

Sep. 21, 2005 (JP) ............................ 2005-274786

(51) Int. Cl.
*H02H 3/00* (2006.01)

(52) U.S. Cl. .................................................... 361/93.1

(58) Field of Classification Search ................. 361/93.1
See application file for complete search history.

(56) References Cited

U.S. PATENT DOCUMENTS 4,553,084 A 11/1985 Wrathall
6,614,302 B2 * 9/2003 Abe .......................... 330/253
6,825,692 B1 * 11/2004 Chung et al. .................. 326/68
2004/0228162 A1 * 11/2004 Pasotti et al. ................ 365/154

FOREIGN PATENT DOCUMENTS

JP 2004-140423 5/2004

* cited by examiner

*Primary Examiner*—Stephen W Jackson
*Assistant Examiner*—Ann T Hoang
(74) *Attorney, Agent, or Firm*—Manabu Kanesaka

(57) ABSTRACT

An overcurrent detecting circuit and reference voltage circuit may reduce the current consumed by an electronic circuit. The circuit may includes a reference load through which a reference current flows, generating a reference voltage. A differential amplifier section is included to amplify the difference in the potentials of two inputs. At least part of a bias current supplied by a constant current source to the differential amplifier section flows to the reference load. A detection voltage, corresponding to a current subject to overcurrent detection, is inputted to one of the two inputs of the differential amplifier section.

15 Claims, 5 Drawing Sheets

OVERCURRENT DETECTING CIRCUIT AND REFERENCE VOLTAGE GENERATING CIRCUIT

BACKGROUND OF THE INVENTION

The present invention relates to an art that reduces the consumption current on an electronic circuit.

Reduction of consumed current is strongly desired for electronic circuits, such as DC-DC converters used in personal digital assistants.

FIG. 4 is a schematic diagram of an overcurrent detection circuit used in, for example, a DC-DC converter, and is disclosed in JP-A-2004-140423.

In FIG. 4, M0 and M1 are both n-channel MOSFETs (metal oxide field-effective transistors), wherein M0 is the main field effect transistor (FET) in an output stage of a DC-DC converter and is used in driving a load ZL. The drain current Id0 of M0 flows from the power line VD to ground, i.e., the reference potential, through the load ZL and M0.

M1 is an FET functioning as a reference load, wherein Id1 is the drain current based on a reference current source Iref, and Iref is a constant-current source from the power line VDD to the ground. In this circuit, Id1 is held equal to Iref, and the mirror ratio of M0 and M1 is assumed to be M.

In this circuit, M0 and M1 have a common gate potential VG equal to each other. In this case, when the drain current Id0 is greater than M×Id1 (also M×Iref), as in the case when Vd0, the drain potential of M0, is greater than Vd1, the drain voltage of M1, the drain current of M0, i.e., Id0, is determined to be an overcurrent.

A comparator COMP compares M0's drain voltage, Vd0, with a reference voltage Vd1 produced by M1. When the relationship Vd0<Vd1 changes into a relationship Vd0>Vd1, such as when the M0 drain current Id0 exceeds M×Iref, the output of comparator COMP changes from "H" to "L", to indicate the overcurrent status.

In the overcurrent detecting circuit of FIG. 4, the overcurrent determining threshold, M×Iref, is determined by the relative characteristics of M0 and M1. In the case that M0 and M1 having matching characteristics, for example, when formed on a same semiconductor substrate, the determining threshold is enhanced in the stability against disturbances, such as temperature change.

FIG. 5 is a partial schematic of an internal circuit configuration of the comparator COMP shown in FIG. 4.

As shown in FIG. 5, the comparator COMP is configured with a differential amplifier section having n-channel MOSFETs M11 and M12 and p-channel MOSFETs M13 and M14. A bias current is supplied by a constant-current source Ib to the differential amplifier section.

FIG. 5 omits an output amplifier section provided in the stage following the differential amplifier section in the comparator COMP.

In addition, M13 and M14 form a differential pair, wherein the gate terminal of M13 is a non-inverted input and M14 is an inverting input. The gate terminal of M13 is fed with a reference voltage Vd1, produced by a reference load M1 and the gate terminal of M14 is fed with a detection voltage Vd0 that has been detected by M0 (FIG. 4). In addition, the current drawn from the power line VDD due to the constant current source Ib branches into two parts and serves as an input to the respective source terminals, M13 and M14.

The respective gate terminals of M11 and M12, and the drain terminal of M11 are connected to the drain terminal of M13. Accordingly, M11 and M12 form a current mirror that makes the M12 drain current equal in magnitude to the M11 drain current. The drain terminal of M12 is connected to the drain terminal of M14, whose connection point provides an output Vout of the differential amplifier section. The respective source terminals of M11 and M12 are connected to ground.

Still referring to FIG. 5, the differential amplifier section formed by M11, M12, M13 and M14 amplifies the difference in the potentials between the respective gate input terminals of M13, M14, the output Vout being the amplified difference. The output, Vout, is further amplified in an output amplifier section in the following stage (not shown) and becomes the output of comparator COMP.

In the overcurrent detecting circuit of FIG. 4, if the mirror ration M can be increased, even if a current supplied from the reference current source Iref is reduced, the same determining threshold M×Iref is obtained, thus reducing the current consumption of the overcurrent detecting circuit.

However, the value M has an upper limit. For example, to provide an overcurrent determining threshold of 500 mA for an M0 having a semiconductor channel width of M0 of 50000 μm, even when the channel width of M1 is reduced to 5 μm, thereby providing M=1000, a reference current Iref as great as 50 μA is required. The value of Iref accounts for a comparatively large percentage of the current, for example, 200-300 μA, consumed by the entire control circuit for a DC-DC converter commonly used in a personal digital assistant.

Meanwhile, in the FIG. 4 circuit, the comparator COMP, for comparing the magnitude between the drain potentials Vd0 and Vd1, requires a certain degree of consumption current (e.g. 50 μA) in order to obtain a sufficient response speed.

SUMMARY OF THE INVENTION

The present invention is conceived in the view of problems described above. It is an object of the present invention to reduce the current consumption of an electronic circuit.

According to a first aspect of the invention, an overcurrent detecting circuit comprises a differential amplifier section that amplifies a voltage difference between two inputs and further comprises a reference voltage and reference current associated with a reference load.

Furthermore, at least a part of a bias current flowing to the differential amplifier section is caused to flow to the reference load, and the resulting voltage is an input to one of the two inputs of the differential amplifier section. In addition, a detection voltage, having a magnitude based upon a current subject to overcurrent detection, serves as an input to the other of the two inputs of the differential amplifier section.

In the overcurrent detecting circuit according to the invention, the reference load is preferably a first MOSFET having a fixed gate potential while the current subject to overcurrent detection may comprise a drain current of a second MOSFET.

With this configuration, it is possible to obtain, as an output of the differential amplifier section, a value resulting from a comparison between a detection voltage and a voltage obtained based on the reference load, from. From the resulting value, it can be known whether or not the subject current is in an overcurrent status.

Because at least a part of a bias current flowing to the differential amplifier section is caused to flow to the reference load, there is no need of a current source exclusively for supplying a current to the reference load. As a result, the total current consumption for the circuit may be reduced.

In the overcurrent detecting circuit according to the invention, the second MOSFET preferably has a channel width greater than a channel width of the first MOSFET. Accordingly, the current to the reference load may be less than the current subject to overcurrent detection.

Furthermore, for the purpose of turning off the second MOSFET, a predetermined fixed voltage, rather than the detection voltage, is preferred as an input to the differential amplifier section. By doing so, erroneous detection of an overcurrent situation may be prevented upon a status transition of the second MOSFET.

In other embodiments, the current flowing to the reference load is preferably decreased when the detection voltage exceeds a voltage obtained at the reference load. In some embodiments, this may be achieved by decreasing the current flowing to the reference load depending upon an output of the differential amplifier section, and is preferably obtained from an amplifier section that receives an output of from the differential amplifier section.

By doing so, a hysteresis characteristic of overcurrent detection is provided, in that after detecting an overcurrent, the threshold for determining whether or not a current, subject to overcurrent detection, is an overcurrent, is lowered. As a result, it is possible to prevent an erroneous circuit operation after detecting an overcurrent situation.

According to a second aspect of the invention, a DC-DC converter is provided wherein a drain current of a MOSFET, used in an output stage to drive a load, is the subject of the foregoing overcurrent detecting circuit.

With a DC-DC converter thus configured, by detecting an overcurrent status of a drain current in an output-stage MOSFET driving a load, the MOSFET can be stopped from operating, thereby preventing a malfunction in the DC-DC converter due to an overcurrent. Here, by using the overcurrent detecting circuit according to the invention, the total current consumption over the circuit entirety can be reduced.

According to a third aspect of the invention, an overcurrent detecting method includes causing at least part of a bias current for a differential amplifier section to flow to a reference load, generating a reference voltage that corresponds to a reference current flowing therethrough.

The method further includes inputting a voltage, generated by current flowing through the reference load, to one of the two inputs of the differential amplifier section, and inputting a detection voltage having a magnitude corresponding to a current subject to overcurrent detection to the other of the two inputs of the differential amplifier section.

The method provides the same effect as that of the overcurrent detecting circuit of the second aspect, resulting in the solution of the problems described above.

According to a fourth aspect of the invention, a reference voltage generating circuit comprises a reference load that a reference voltage is to be obtained that corresponds to a reference current flowing therethrough, whereby at least a part of a constant current, flowing to a differential amplifier section for amplifying a potential difference of between two inputs, is caused to flow to the reference load.

With this configuration, at least a part of a constant current, flowing to a differential amplifier section for amplifying a potential difference of between two inputs, is caused to flow to the reference load. Accordingly, there is no need of a current source exclusively for providing current to the reference load. As a result, the total current consumption of the circuit entirety is reduced.

According to a fifth aspect of the invention, a reference voltage generating method comprises causing at least a part of a bias current, flowing to a differential amplifier section for amplifying a potential difference of between two inputs, to flow to a reference load having a reference voltage potential corresponding to a reference current flowing therethrough. This method provides the same effect as that of the overcurrent detecting circuit of aspect four, resulting in solving the problems described above.

The invention, disclosed above, provides an effect that the total consumption current of an electronic circuit is reduced.

DETAILED DESCRIPTION OF THE INVENTION

With reference to the drawings, description is now made on an embodiment of the present invention.

Figure 1:
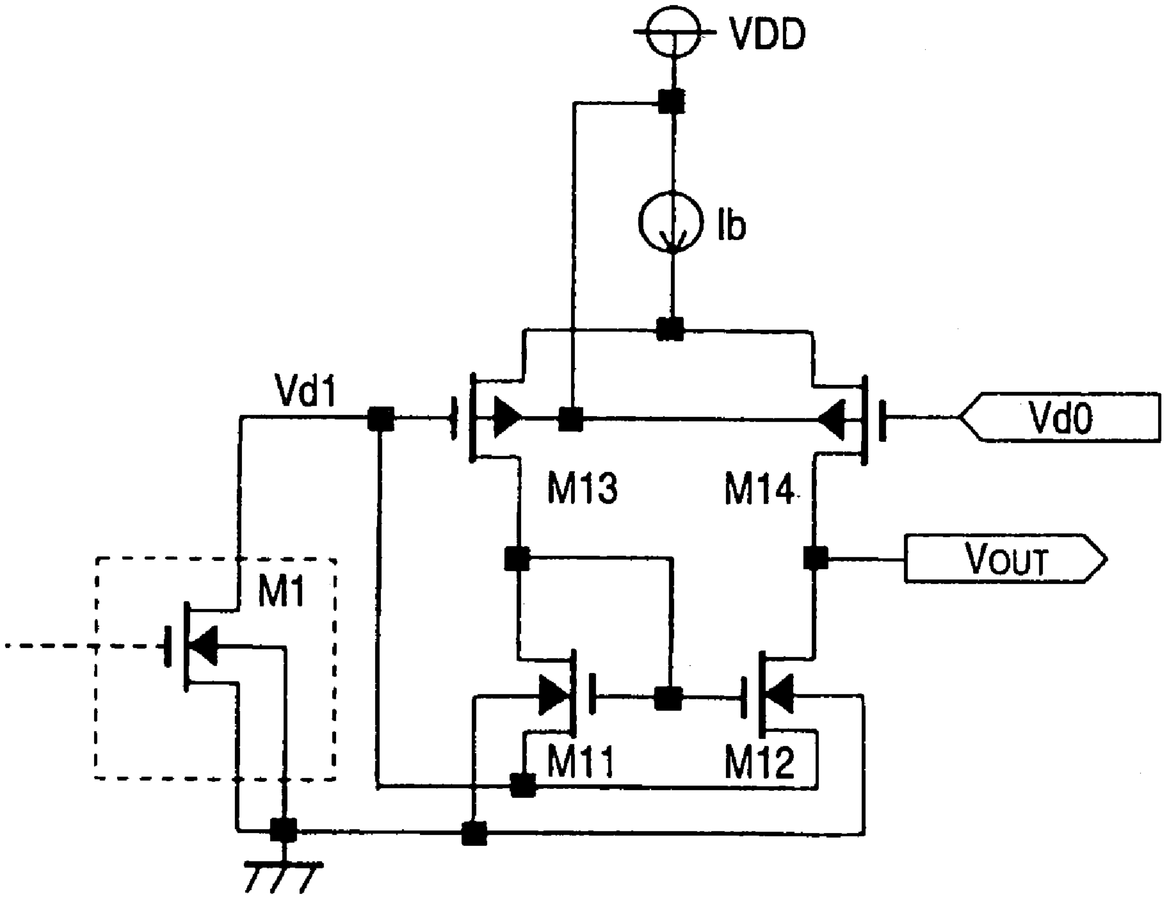
FIG. 1 is a schematic view of an embodiment of a reference-voltage generating circuit according to the invention.

Referring first to FIG. 1, the figure illustrates a reference-voltage generating circuit for carrying out the invention. This circuit, operating similarly to that shown in FIG. 5, comprises an overcurrent detecting circuit, like that in FIG. 4, that can be configured by replacing the comparator COMP and reference-current source Iref, shown in the FIG. 4, with the FIG. 1 circuit (excepting the transistor M1) and adding an output amplifier to the output Vout in the FIG. 1 circuit.

The circuit is FIG. 1 is now described.

Referring back to FIG. 1, a differential amplifier section comprises n-channel MOSFETs M11, M12 and p-channel MOSFETs M13, M14. A bias current is supplied to the differential amplifier section by a constant-current source Ib and the p-channel MOSFET M1 is a reference load that is similar to that shown in FIG. 4.

An input differential pair is configured by M13 and M14. The gate terminal 102 of M13, serving as a non-inverted input of the input differential pair, is connected to a drain terminal of a FIG. 4 reference load M1, and is fed by a reference voltage generated by the reference load M1.

Figure 4:
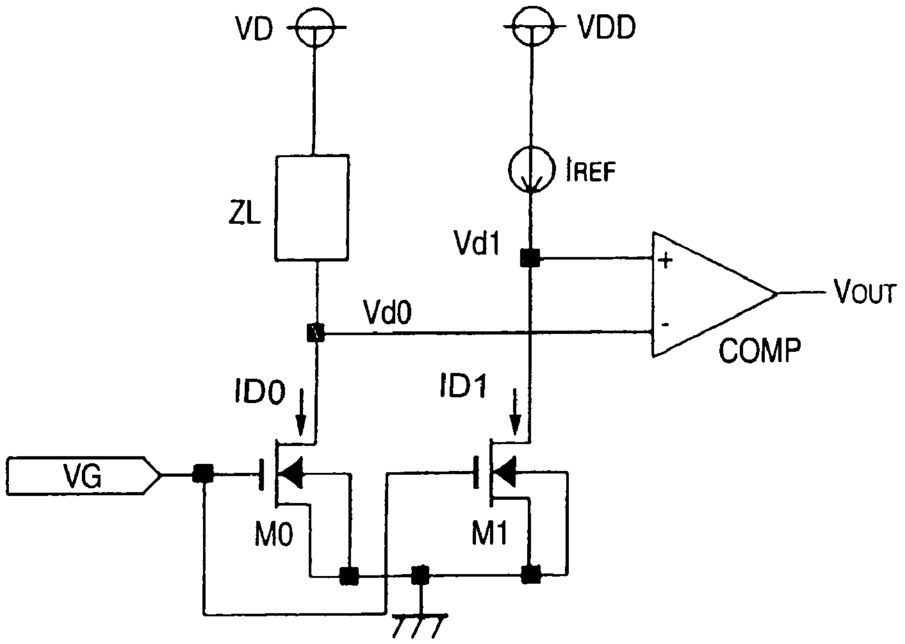
FIG. 4 Prior Art
FIG. 4 is a schematic diagram showing an example of an existing overcurrent detecting circuit.

Gate terminal of M14 is an inverted input to the differential pair M13 and M14, and receives as an input a voltage Vd0 that is to be comparison with a voltage Vd1. If it is assumed herein that the FIG. 1 circuit is applied to the overcurrent detecting circuit shown in FIG. 4, the drain potential Vd0 of M0, as shown in FIG. 4, is inputted as a detection voltage corresponding to the magnitude of a current subject to overcurrent detection. Furthermore, the current supplied through a power line VDD by the constant-current source Ib branched into two parts and are inputted to the source terminals of M13 and M14.

The respective gate terminals of M11 and M12 and the drain terminal of M11 are interconnected and are connected to the drain terminal of M13. Consequently, M11 and M12 is a current mirror operable to make the drain current of M12 equal to the drain current of M11. In addition, the drain terminal of M12 is connected to the drain terminal of M14, whose connection point provides an output Vout of the differential amplifier section.

The voltage potential between the gate terminals of M13 and M14, i.e. Vd1 and Vd0, the two inputs of the differential amplifier section, is amplified and is outputted as signal Vout.

Furthermore, the respective source terminals of M11 and M12 are connected to the drain terminal of M1 as a reference load.

Figure 5:
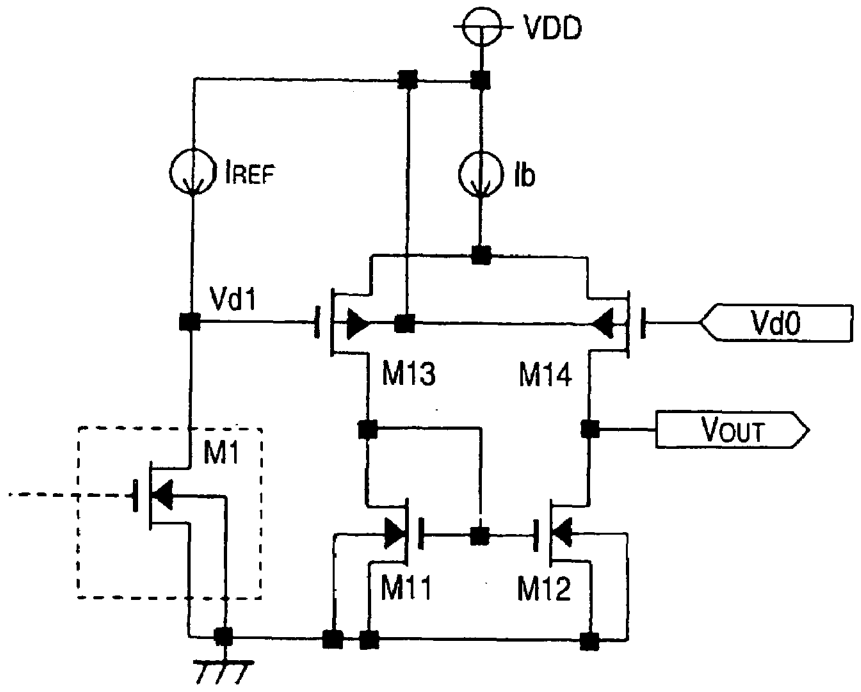
FIG. 5 Prior Art
FIG. 5 is a schematic diagram illustrating a part of an internal circuit of a comparator shown in FIG. 4.

As can be understood by comparing the FIG. 1 configuration and the FIG. 5 configuration, unlike FIG. 1, the FIG. 5 circuit includes a reference current source Iref to supply a current to a reference load M1 thereby generating reference voltage Vd1.

The FIG. 1 circuit, on the other hand, illustrates wherein the source terminals of M11 and M12, which in FIG. 5 are connected to the ground, are connected to the drain terminal of M1.

Unlike FIG. 5, FIG. 1 illustrates wherein the bias current supplied by the constant-current source Ib to the differential amplifier section comprising M11, M12, M13 and M14 flows from the source terminals of M11 and M12 to the reference load M1, thereby generating voltage Vd1.

In other words, in the FIG. 1 circuit, the constant current to the reference load M1 is obtained from the bias current Ib, a constant current flowing to the differential amplifier. Thus, the FIG. 1 circuit does not require a reference current source Iref needed in the FIG. 5 circuit. As a result, the total current consumption of the circuit is less in the FIG. 1 circuit than in the FIG. 5 circuit.

Incidentally, in the FIG. 1 circuit, the output Vout has a lower limit voltage, assuming Vd1 instead of zero, taken as in the FIG. 5 circuit. However, this is not problematic if Vd1 is sufficiently small as to be allowed by the connected circuit in the stage following to the output Vout.

Figure 2:
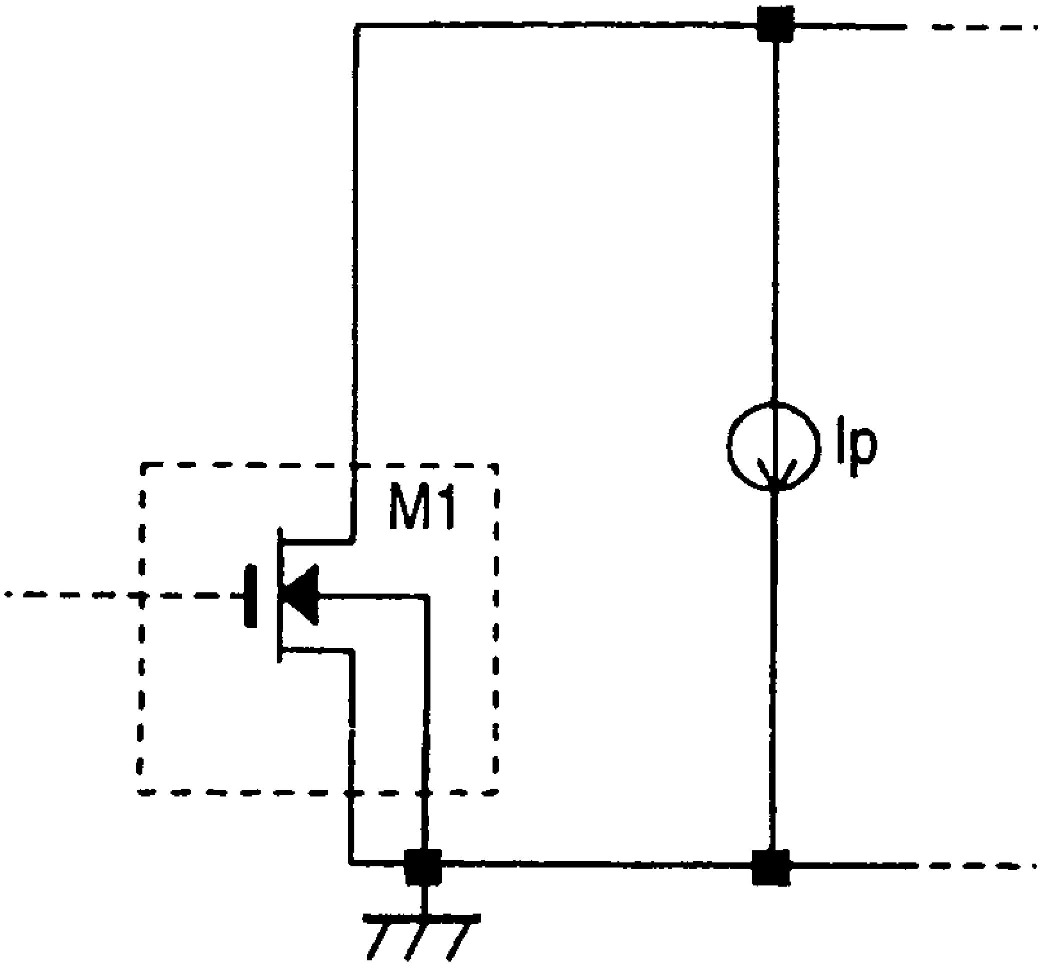
FIG. 2 is a schematic view illustrating an example of the techniques to limit the current flowing to a reference load.

As disclosed above relative to FIG. 1, all the bias current Ib delivered to the differential amplifier section flows as a reference current to the reference load M1. If, however, it is desired to reduce such a reference current, FIG. 2 illustrates a technique whereby a constant current source Ip is connected between the drain and source terminals of the reference load Ml, i.e., in parallel therewith, so that only a part (Ib−Ip) of the bias current Ib is allowed to flow to the reference load M1.

Figure 3:
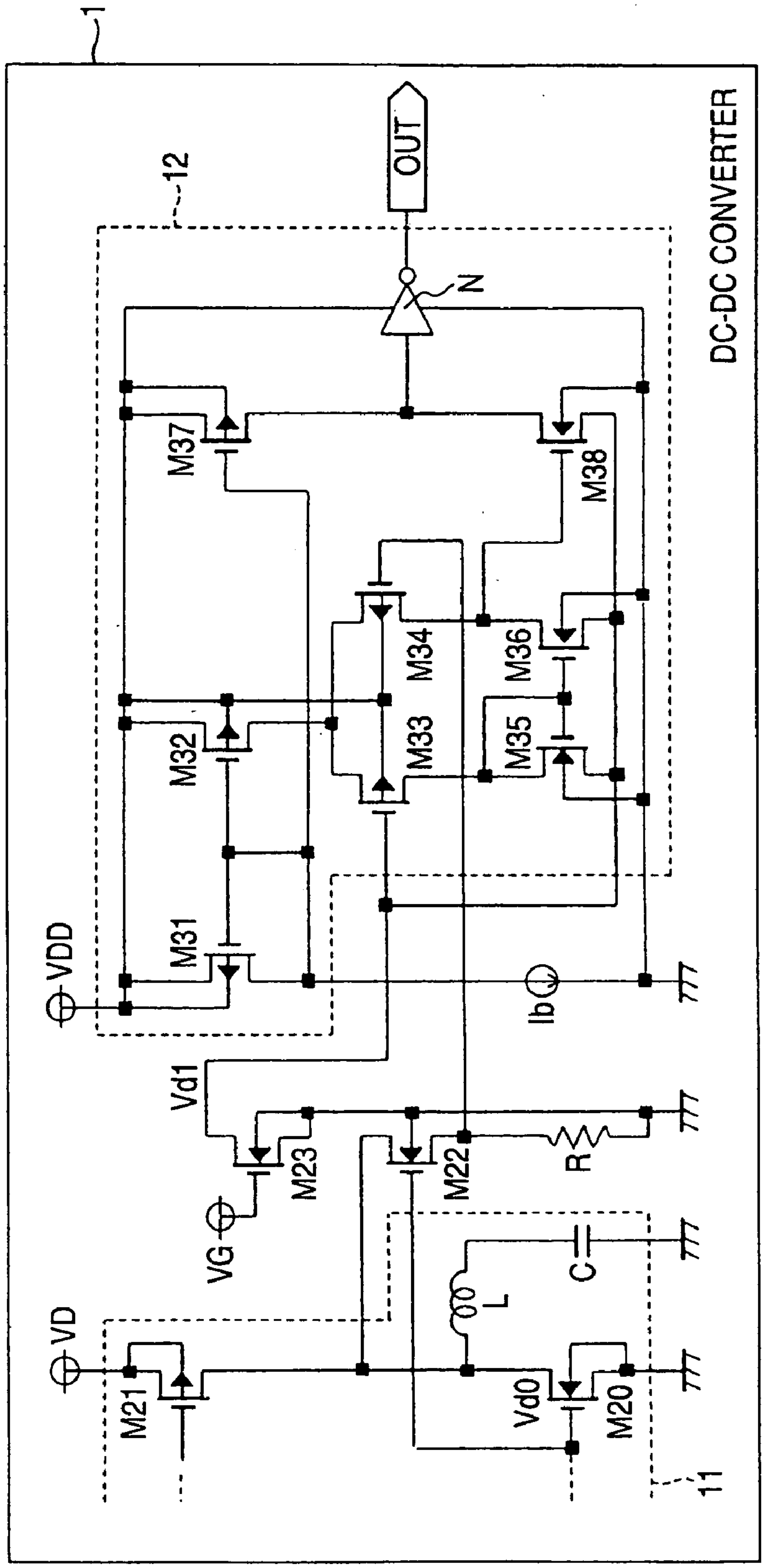
FIG. 3 is a schematic view illustrating a portion of a DC-DC converter operable to detect an overcurrent in an output by use of an overcurrent detecting circuit according to the invention.

Referring to FIG. 3, there is shown a portion of a DC-DC converter 1 operable to detect an overcurrent by use of an overcurrent detecting circuit. FIG. 3 illustrates one embodiment of an output stage comprises a synchronous commutation type DC-DC converter and an overcurrent detecting circuit based on a low-side n-channel MOSFET.

FIG. 3 comprises n-channel MOSFETs M20, M22, M23, M35, M36 and M38, and p-channel MOSFETs M21, M31, M32, M33, M34 and M37.

Output stage 11 of DC-DC converter 1 supplies power to the load, M21 and M20, connected in series. Those are inserted, in the order of M21 and M20, between a power line VD of the output stage 11 and the ground, wherein M20 is one of the main MOSFETs (synchronous-commutation transistors) in the output stage 11.

In the FIG. 3 circuit, an overcurrent status is to be detected on the M20 drain current. When an overcurrent status is detected, the operation of M21 and M20 may be switched off to prevent the DC-DC converter 1 from malfunctioning due to the overheating of M20, etc.

In the FIG. 3 circuit, an overcurrent condition may be detected on the drain current of M20. The drain potential Vd0 of M20 is provided as a detection voltage corresponding to the magnitude of a current subject to overcurrent detection. Furthermore, the series connection of LC, connected in parallel with M20, provides an output smoothing filter in the DC-DC converter 1.

Because M23 is a reference load in the overcurrent detecting circuit, its drain current, if caused to flow, provides a voltage corresponding to the relevant current. Note that, considering the response speed of the comparator section 12, the gate potential VG of M23 is previously fixed at the maximum gate potential of M20 during operating the DC-DC converter 1. Meanwhile, if M23 is arranged adjacent to M20 in consideration to match their electric characteristics, such as their resistance to a disturbance such as temperature change, the stability of determining a threshold is preferably improved.

Note that, in this embodiment, the second MOSFET M20 has a channel width greater than that of the first MOSFET M23. The channel width ratio of between M20 and M23, i.e. mirror ratio, is assumed M.

Preferably, M20 and M23 are matched, such as by forming them adjacent on a same semiconductor substrate, to match their electric characteristics, i.e., temperature characteristics.

Still referring to FIG. 3, M22 and a resistance R is used to prevent the status change in the comparator section 12 in the off period of M20 during the operation of the DC-DC converter 1.

Because M22 at its gate terminal is connected to the gate terminal of M20, M22 functions as a switch operating based upon the state of M20. Namely, when M20 is on, M22 also assumes on. At this time, the drain terminal of M20 is connected to the gate terminal of M34 through M22, thereby inputting the M20 drain potential Vd0, as a detection voltage, to the gate terminal of M34. Meanwhile, when M20 assumes off, M22 is also off. The resistance R is inserted between the M22 source terminal and the ground.

Accordingly, when M22 turns off, the ground potential in place of the detection voltage Vd0 is inputted to the gate terminal of M34. That is, when M20 is off, the M20 drain current is determined to be zero by the comparator section 12. Thus, it is possible to prevent the comparator section 12 from erroneously detecting an overcurrent.

Incidentally, the resistance R is provided with a value sufficiently higher than an M22 on-resistance. This makes it possible to ignore the voltage drop, caused by an M22 on-resistance, in the detection voltage Vd0 inputted to the M34 gate terminal.

One embodiment of the comparator section 12 comprises a current mirror having all the gate terminals of M31, M32 and M37 and the drain terminal of M31, connected. Furthermore, in this embodiment, M31, M32 and M37 have a channel-width ratio (i.e. mirror ratio) of 1:A:B, and all the source terminals of M31, M32 and M37 are connected to the power line VDD. Furthermore, because a constant current source Ib is connected between the drain terminal of M31 and the ground, the drain current of M31 is determined by the constant current source Ib. Accordingly, M32 can be regarded as a constant current source to supply a drain current of A×Ib. Meanwhile, M37 can be regarded as a constant current source to supply a drain current of B×Ib.

A differential amplifier section is configured by M33, M34, M35 and M36. Because the bias current to the differential amplifier section is provided by M32's drain current, a constant current A×Ib is supplied as a bias current to the differential amplifier section.

M33 and M34 comprise an input differential pair. A reference voltage Vd1, obtained by a reference load M23, is supplied to a non-inverted input of the input differential pair, i.e., the gate terminal of M33. In addition, a detection voltage Vd0, due to M20 being turned on via M22, is supplied to the gate terminal of M34, i.e. an inverted input of the input differential pair. Incidentally, the constant current A×Ib from M32 is split into two components and inputted to the source terminals of M33 and M34.

The gate terminals of M35 and M36 and the drain terminal of M35 are connected to the drain terminal of M33. Accordingly, M35 and M36 form a current mirror making the drain current of M36 equal to the drain current of M35. The drain terminal of M36 is connected to the drain terminal of M34, whose connection point is an output of the differential amplifier section and serves as an input to the gate terminal of M38.

M38 is an amplifier section that receives the output of the differential amplifier section and inverts the relevant output. The drain terminal of M38 is connected to an inverter N for inverting the output of M38. The output of the inverter N is the output (OUT) of the comparator section 12. Incidentally, because the drain terminal of M38 is connected with the drain terminal of M37, a constant current B×Ib flows through M38 when M38 is on.

The respective source terminal of M35 and M36 and the source terminal of M38 are connected to the drain terminal of M23 which serves as a reference load. Accordingly, when M38 is on, i.e. when Vd0<Vd1, a drain current (A+B)×Ib flows through M23. This current includes at least a part of the bias current supplying the differential amplifier section. When the current is supplied to M23, M23 has a drain potential Vd1 serving as a reference voltage.

In this embodiment, M20 and M23 have a mirror ration of M. Because the gate potential VG of M23 is previously made equal to the gate maximum potential of M20, Vd0 is held less than Vd1 when the M20 drain current is less than M×(A+B)×Ib. In this case, the output OUT of comparator section 12 is maintained at a "H" level.

When the drain current of M20 exceeds M×(A+B)×Ib an overcurrent status exists resulting in Vd0>Vd1. Thereupon, by the operation of the differential amplifier section formed by M33, M34, M35 and M36, the M38 gate potential is lowered. This increases the drain voltage of M38 and inverts the output of the inverter N. As a result, the output OUT of the comparator section 12 switches from a "H" to "L" level, thus indicating an overcurrent state.

When the overcurrent state is detected, the M21 gate in the output stage 11 is fixed at a high gate potential to swiftly lower the M20 gate potential, thus reducing the drain current thereof and canceling the overcurrent state.

Incidentally, in the differential amplifier section, when the M38 gate potential is decreased to an off state by the detection of the overcurrent state, the source current, B×Ib of M37 ceases from supplying the reference load M23. In this case, the threshold, for determining an overcurrent in the M20 drain current, lowers to M×A×Ib. Namely, after once the M20 drain current is determined to be an overcurrent surpassing M×(A±B)×Ib, the present overcurrent detecting circuit no longer determines a restoration to the normal current unless the current drops below M×A×Ib.

By thus reducing the current to the reference load M23, depending upon the output of the differential amplifier section which detected an overcurrent status, hysteresis is provided in the threshold current that determines an overcurrent state.

However, when an overcurrent is detected in the DC-DC converter, generally the output stage FET is immediately stopped from operating instead of continuing the operation upon detecting an overcurrent. In this respect, no special problems arise. In fact, such a hysteresis characteristic of overcurrent determining threshold is preferred in view of preventing against the malfunction in the overcurrent detecting circuit.

Incidentally, in the FIG. 3 circuit, the overcurrent determining threshold on the M20 drain current was M×(A×B)×Ib. For this reason, the overcurrent determining threshold can be increased by increasing the value M through increasing the channel width of M20 to be greater than the channel width of M23. However, the operation delay in the comparator section 12 is not negligible relative to the change in detection voltage Vd0, therefore, it is preferred to adjust the threshold toward a lower setting.

Although the embodiments of the invention was described so far, the invention is not limited to the foregoing embodiments but can be improved or modified in various ways within the scope not departing from the gist of the invention.

For example, although the embodiment employed the MOSFETs, a similar circuit can be configured by using junction FETs.

Meanwhile, it is also possible to configure a DC-DC converter having an overcurrent detecting circuit on the drain current of a switching transistor rather than a synchronous commutation transistor, by switching between the MOSFET conductivity types (p, n) and between the power source and the ground in the FIG. 3 circuit.

The disclosure of Japanese Patent Application No. 2005-274786 filed on Sep. 21, 2005 is incorporated herein as a reference.

While the invention has been explained with reference to the specific embodiments of the invention, the explanation is illustrative and the invention is limited only by the appended claims.

What is claimed is:

1. An overcurrent detecting circuit comprising:

a differential amplifier section comprising two inputs, that amplifies a potential difference between the two inputs; and a reference load through which a reference current flows for generating a reference voltage;

wherein at least a part of a bias current supplied to the differential amplifier section flows to the reference load, as the reference current, the reference voltage obtained by supplying the reference current to the reference load is inputted to one of the two inputs of the differential amplifier section, and a detection voltage corresponding to a magnitude of a current subjected to overcurrent detection is inputted to the other of the two inputs of the differential amplifier section.

2. An overcurrent detecting circuit according to claim 1, wherein the reference load is a first MOSFET having a fixed gate potential, and the current subject to overcurrent detection is a drain current of a second MOSFET.

3. An overcurrent detecting circuit according to claim 2, wherein the second MOSFET has a channel width greater than a channel width of the first MOSFET.

4. An overcurrent detecting circuit according to claim 2, wherein a predetermined fixed voltage is inputted to the differential amplifier section when turning off the second MOSFET.

5. An overcurrent detecting circuit according to claim 1, wherein the current flowing to the reference load is decreased when the detection voltage exceeds a voltage obtained at the reference load.

6. An overcurrent detecting circuit according to claim 5, wherein the current flowing to the reference load is decreased depending upon an output of the differential amplifier section.

7. An overcurrent detecting circuit according to claim 5, wherein the current decreased is obtained from an amplifier section operable to receive an output from the differential amplifier section.

8. A DC-DC converter comprising an overcurrent detecting circuit according to claim 1, wherein a drain current of a MOSFET, in an output stage of a circuit operable to drive a load, is a subject of overcurrent detection.

9. An overcurrent detecting circuit according to claim 1, wherein the reference voltage is obtained by supplying the reference current to the reference load without an additional current.

10. An overcurrent detecting method, comprising:

flowing, to a reference load as a reference current, at least a portion of a bias current flowing to a differential amplifier section for amplifying a potential difference between two inputs, said reference load generating a reference voltage corresponding to the reference current without an additional current when the reference current flows;

inputting the reference voltage obtained by flowing the reference current to the reference load to one of the two inputs of the differential amplifier section; and inputting a detection voltage having a magnitude corresponding to a current subject to overcurrent detection, to the other of the two inputs of the differential amplifier section.

11. An overcurrent detecting method according to claim 10, wherein the current flowing to the reference load is decreased when the detection voltage exceeds a voltage obtained at the reference load.

12. A reference voltage generating circuit comprising:

a reference load for providing a reference voltage corresponding to a reference current when the reference current flows; and a differential amplifier section operable to amplify a potential difference between two inputs, at least a part of a constant current flowing to the differential amplifier section being supplied to the reference load as the reference current without an additional current.

13. A reference voltage generating circuit according to claim 12, wherein the reference voltage obtained by supplying the reference current to the reference load is inputted to one of the two inputs of the differential amplifier section.

14. A reference voltage generating method, comprising:

flowing a part of a bias current supplied to a differential amplifier section operable to amplify a voltage difference between two inputs, to a reference load as a reference current, said reference load generating a reference voltage corresponding to the reference current without an additional current when the reference current flows.

15. A reference voltage generating method according to claim 14, wherein the reference voltage obtained by supplying the reference current to the reference load is inputted to one of the two inputs of the differential amplifier section.

* * * * *